US006499104B1

(12) United States Patent
Joux

(10) Patent No.: US 6,499,104 B1
(45) Date of Patent: Dec. 24, 2002

(54) DIGITAL SIGNATURE METHOD

(75) Inventor: Antoine Joux, Thorigne-Fouilard (FR)

(73) Assignee: Etat Francais Represente Par le Delegue General pour l'Armement, Armees (FR)

(\*) Notice: Subject to any disclaimer, the term of this patent is extended or adjusted under 35 U.S.C. 154(b) by 0 days.

(21) Appl. No.: 09/215,268

(22) Filed: Dec. 18, 1998

(30) Foreign Application Priority Data

Dec. 18, 1997 (FR) .............................. 97 16061

(51) Int. Cl.$^7$ .............................. H04L 9/00; H04L 9/30; H04L 9/28
(52) U.S. Cl. .................. 713/176; 713/170; 713/171; 713/177; 713/178; 713/180; 713/168; 380/28; 380/30
(58) Field of Search .................. 713/176, 168–170, 713/178, 180, 171, 177; 380/29–30

(56) References Cited

U.S. PATENT DOCUMENTS

| | | | |
|---|---|---|---|
| 4,405,829 A | | 9/1983 | Rivest et al. |
| 4,995,082 A | | 2/1991 | Schnorr |
| 5,150,411 A | \* | 9/1992 | Maurer ........................ 380/30 |

OTHER PUBLICATIONS

L.Harn and Y.Xu, Design of generalised ElGamal type digital signatures schemes,Nov. 1994,IEEE).\*
Okamoto, An efficient digital signature scheme, crypto 92, LNCS 740,p. 54–65, 1993, Springer–verlag Berlin Heidelberg 1993.\*

Bruce Schneier, Applied cryptography, 1996, Katherine Schowalter, second edition, page 496–498.\*

R.L. Rivest et al., "A Method for Obtaining Digital Signatures and Public Key Cryptosystems", *Communications of the ACM*, Feb. 1978, vol. 21, No. 2, pp. 120–126.

T. Elgamal, "A Public Key Crypotosystem and a Signature Scheme Based on Discrete Logarithms", *IEEE Transactions on Information Theory*, Jul. 1985, vol. IT–31, No. 4, pp. 469–472.

Maurer and Yacobi, "Non–Interactive Public–Key Cryptography", *EUROCRYPT '91, Lecture Notes in Computer Science*, Springer–Verlag, vol. 547, pp. 498–507, 1991.

\* cited by examiner

*Primary Examiner*—Gilberto Barrón
*Assistant Examiner*—Kambiz Zand
(74) *Attorney, Agent, or Firm*—Oliff & Berridge, PLC

(57) ABSTRACT

The present invention relates in particular to a method for generating a digital signature (c, d) of a message M as well as a method for authenticating such a signature having the steps of defining a modulo N and a base g, a public key Y, and a private key x, these parameters N, g, Y, and x being linked by the relationship $Y=g^x \pmod{N}$, defining a hash function H the size of whose result has S bits, choosing a number r of T bits with T>=2S, calculating u from the following relationship $u=g^r*Y^z$ where $Z=2^s$, hashing the concatenation of M and u, by function H, the number thus obtained being the value c of the signature, and calculating the value d of the signature by the relationship: $d=r+c*x$.

9 Claims, 2 Drawing Sheets

DIGITAL SIGNATURE METHOD

The present invention relates in particular to a method for generating a digital signature (c,d) of a message M as well as a method for authenticating such a signature.

The purpose of digital signature methods is to certify the origin of an electronic document. Similarly to a handwritten signature, a digital signature is added to an electronic message to ensure its authenticity. Consider the practical case in which an entity A of a communications system wishes to address a message M to an entity B. In a first signature generation phase the sender A, after writing his message, carries out a number of mathematical operations according to the message M to be signed and operands which can be either secret or public. These calculations will generate a digital entity which will be called the signature. The message M. and its signature, are then transmitted electronically. In a second phase, after receiving the message and the signature, recipient B will in turn perform mathematical operations. The validity of the signature received can be verified from the result of the latter calculations. It should be noted that the goal of the signature function is to authenticate a message M, not to ensure the confidentiality of its content. This message can thus be transmitted either in cleartext or in code by an encryption function that is fully independent of the signature mechanism.

Overall, a digital signature method does the following in a modern communications system:
  (a) Definitely authenticates the identity of the message sender.
  (b) Ensures the integrity of the contents of a message (verifies that the message was not altered during its transmission).

In digital signature methods, security is based on the extreme difficulty of reversing certain mathematical functions. Because of the power of today's computers, it is now impossible to solve some of these equations without knowing the secret elements of the algorithm.

At the present time, there are various digital signature methods.

A first type, developed by Rivest-Shamir-Adelman, is based on the difficulty of factoring large whole numbers (see "A Method for Obtaining Digital Signatures and Public Key Cryptosystems," Communications of the ACM, February 1978, Vol. 21, No. 2, pp. 120–126, and U.S. Pat. No. 4,405,829 referring thereto).

A second type, developed by Taher El-Gamal, proposes signature algorithms based on the discrete logarithm problem involving discrete exponentiation (see "A Public Key Cryptosystem and a Signature Scheme Based on Discrete Logarithms," IEEE Trans. on Inform. Theory, Vol. IT-31, pp. 469–472, July 1985).

Discrete exponentiation has three arguments, the exponentiation base g the exponent x, and the modulo N. The discrete logarithm problem, given the mathematical relationship: $Y = g^x$ modulo N (which means: Y is the remainder when $g^x$ is divided by N), consists of finding x when N, g, and Y are known.

A method of the same type, but simpler, was disclosed by Schnorr and was the subject of U.S. Pat. No. 4,995,082. It is distinguished from that of El-Gamal by consisting of reducing the size of the exponents of the discrete exponentiations to speed up calculation. Here, an element g generates a subgroup of order q, with q on 160 bits for example. Also, a hash function is used in calculating the signature.

The digital signature thus generated is small in size.

In general, discrete exponentiation be either modular exponentiation in which one is working with whole numbers having a well-chosen number for a modulo, or multiplication by a whole number on an elliptical curve which is an operation similar to modular exponentiation, but is defined in a group noted additively and not multiplicatively.

In numerous applications, the digital signature must be created and verified in real time. Certain methods, such as the El-Gamal method, require a heavy financial outlay because the algorithms demand very powerful computers. To obviate these constraints, optimization of the algorithms simplifies the calculations while retaining comparable security.

The discrete exponentiation solution is today the most broadly used solution in cryptographic systems, and certain improvements have been made to the algorithms to increase the speed of calculation while retaining maximum security.

With this perspective, reducing the size (number of bits) of the exponent is very important because the calculation time of modular exponentiation is proportional to this size.

Also, in algorithms known to date, the cardinal of the group in which one is working must be known. The cardinal of this group is a function of the choice of modulo N. Since the security of the algorithm is based on discrete exponentiation, it must be made impossible to solve. This security implies certain constraints in the choice of modulo N.

In the case of modular exponentiation, the security of discrete exponentiation offered only two options as to choice of modulo in the prior art.

With the first possibility, N is the product of two whole numbers. El-Gamal proposed choosing N so that (N–1)/2 is prime and the divisor used is (N–1).

The second option concerns algorithms based on discrete exponentiation where a subgroup must be known as well as its cardinal, the cardinal of this subgroup being a divisor of N–1 if N is prime, or a divisor of the number of points on the curve in the case of an elliptical curve. Schnorr proposes choosing q as the cardinal of the subgroup, q being such that it divides N–1.

The invention overcomes these drawbacks by proposing a method for decreasing the complexity of the calculations so that one can work in real time with a PC computer.

It also overcomes the aforesaid limitations, as the choice of modulo N is no longer limited to the two above options or calculation of the number of points on the elliptical curve is no longer necessary.

For this purpose, a method for generating a digital signature (c,d) of a message M consists of:
  defining a modulo N and a base g, a public key Y, and a private key x, these parameters N, g, Y, and x being linked by the relationship:

$$Y = g^x (\bmod N)$$

defining a hash function H the size of whose result has S bits
  choosing a number r of T bits with $$T >= 2S$$

calculating u from the following relationship:

$$u = g^r * Y^z$$

where $$Z = 2^S$$

by function H, hashing the concatenation of M and u, the number thus obtained being the value c of the signature, calculating the value d of the signature by the relationship: d=r+c*x.

According to an additional characteristic enabling computing time to be reduced still further, message M is hashed by a function $h_1$ before being hashed by function H then concatenated with u, the functions $h_1$ and H possibly being identical.

According to one particular characteristic, private key x is defined before public key Y, the latter then being calculated by the relationship:

$$Y=g^x \pmod N.$$

According to another characteristic, characterized in that public key Y is defined before private key x, and in that modulo N is chosen to be not a prime.

According to another characteristic, the number r is a random number.

The invention also relates to a method of authenticating the digital signature (c,d) of a message M generated according to the invention, this method being characterized by consisting, when public key Y, modulo N, and base g and hash function H, hence the value of S, are known, of:

calculating u by the relationship $$u=g^{d}*Y^{(z-c)}$$

with $$Z=2^S$$

hashing the concatenation of M and u by the function H, verifying that the value thus obtained is equal to c if the signature is authentic.

According to an additional characteristic of this method, message M is hashed by function h1* before being hashed by function H then concatenated with u.

Other advantages and characteristics of the present invention will emerge from the description of a particular embodiment of the invention, having regard to the attached figures, of which:

Figure 1:
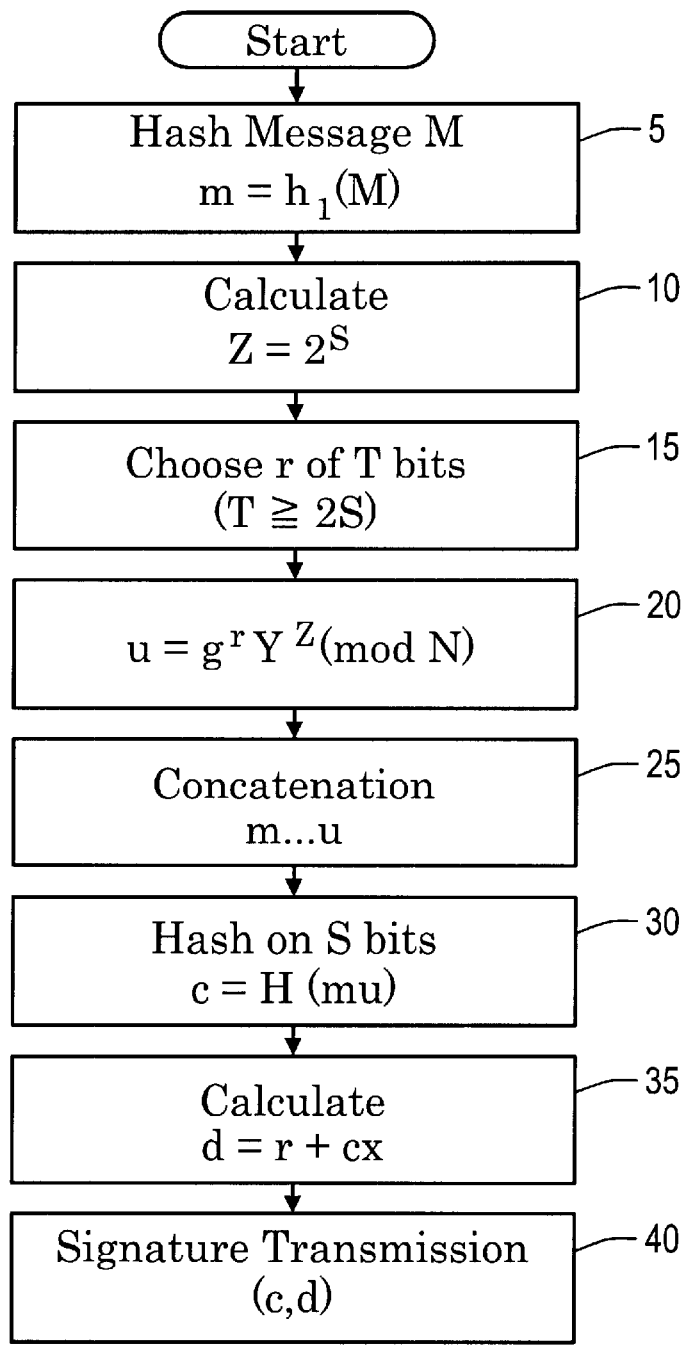
FIG. 1 is a diagram of a digital signature generation process.

The method according to the invention is used, among other things, to generate and verify the signature of a message M. Independently of the signature signing and verification phases, an authority that guarantees security within the communications system establishes the following general parameters:

a) Modulo N. The size of this modulo is fixed by considerations linked to the security of the algorithm (today, 1024 bits is a good choice). This modulo can be common to several users (possibly a large number of users) within the cryptosystem. This can, depending on the variants, be a prime or non-prime number, an elliptical curve, or more generally a group for which discrete exponentiation is difficult to reverse.

b) Base g. This is a generator of the subgroup of the group determined by modulo N (number modulo N, point on elliptical curve, element of group chosen). The subgroup generated must have large cardinality ($>2^S$, where S is the size of the result of H, the hash function explained below) but is not necessarily all the modulo group N. Just like N, g can be common to several users.

The cardinality must be large but the signature and verification algorithms do not need to know it. It is thus possible to work with exponentiation as the basic operation and at the same time to choose N as the product of prime numbers.

Parameters N and g are general parameters established once and for all and common to user groups. They are not secret, because simply knowing them does not enable one to defeat the security of the algorithm.

The individual responsible for the cryptosystem assigns to each user a pair of keys personal to him. Key x is called private key and Y is called public key. Key x must be known only by its user. Only this individual uses it in the signature generation phase. Key Y is public. It is personal to message sender A. Each user, on receiving a message from A, is informed of the identity of the sender. He can use a key directory to find the key Y associated with the message sender and use it in the signature verification phase. Key Y pertaining to entity A is thus used both by entity A and by entity B. The two keys are linked by the fact that Y is the result of the discrete exponentiation to base g, for exponent x and for modulo N. They are linked by the following relationship:

$$Y=g^x \pmod N$$

In the two options described below relating to the choice of x and Y, the private key is known only to the user of the key. If the private key is divulged, the discrete logarithm problem disappears and the system is no longer secured.

According to the first option, the private key and the public key are chosen by establishing x as having the size S bits (for example S=160 if the SHA standard is chosen for H), then Y is calculated with the above relationship. This variant makes it possible to used small private keys (160 bits for example) and to work on an elliptical curve without having first to calculate the cardinal of this curve.

According to the second option, one begins by establishing Y for example by deriving it from the name of the user (see Maurer and Yacobi, Non-interactive Public-key Cryptography, EUROCRYPT'91, Lecture Notes in Computer Science, Springer-Verlag, Vol. 547, pages 498–507, 1991) then one deduces x by a modulo N discrete logarithm calculation. This method implies using, for N, a non-prime number, N=pq, so that it is feasible to calculate the logarithm. It also requires that the decomposition N=pq not be divulged so that the calculation cannot be made by just anyone. The signature method presented here enables p and q not to be divulged, contrary to other known methods: in the latter, it is necessary for everyone to be aware of the cardinal of the multiplier group, namely (p−1)(q−1), so that knowledge of (p−1)(q−1) leads to p and q.

The authority responsible for the cryptosystem imposes a hash function H, known to all the users. This function is used to transform any number of any size into a number of S bits. The choice of H and S is independent of the algorithm so that any hash function known to date can be used.

After this preliminary phase, we will now consider two entities A and B wishing to establish a secured link in the information system. In the first step, described in relation to FIG. 1, entity A calculates a digital signature, represented by the pair (c,d), from message M that it wishes to send to entity B. This signature step is accomplished entirely by entity A.

Message M, potentially very long, can be transformed by any hash function $h_1$ to give the result m.

We then write $Z=2^S$, being fixed by the choice of the hash function.

We choose at random a random number r of T bits (with T fixed and T>=2S).

We calculate number u with the following relationship:

$$u = g^r Y^z \pmod{N}$$

We concatenate the numbers m and u by simple juxtaposition.

We hash the result of the concatenation of m and u using has function H. Note that c is the number formed from S bits of the result.

We calculate the number d by the following relationship:

$$d = r + cx$$

Figure 2:
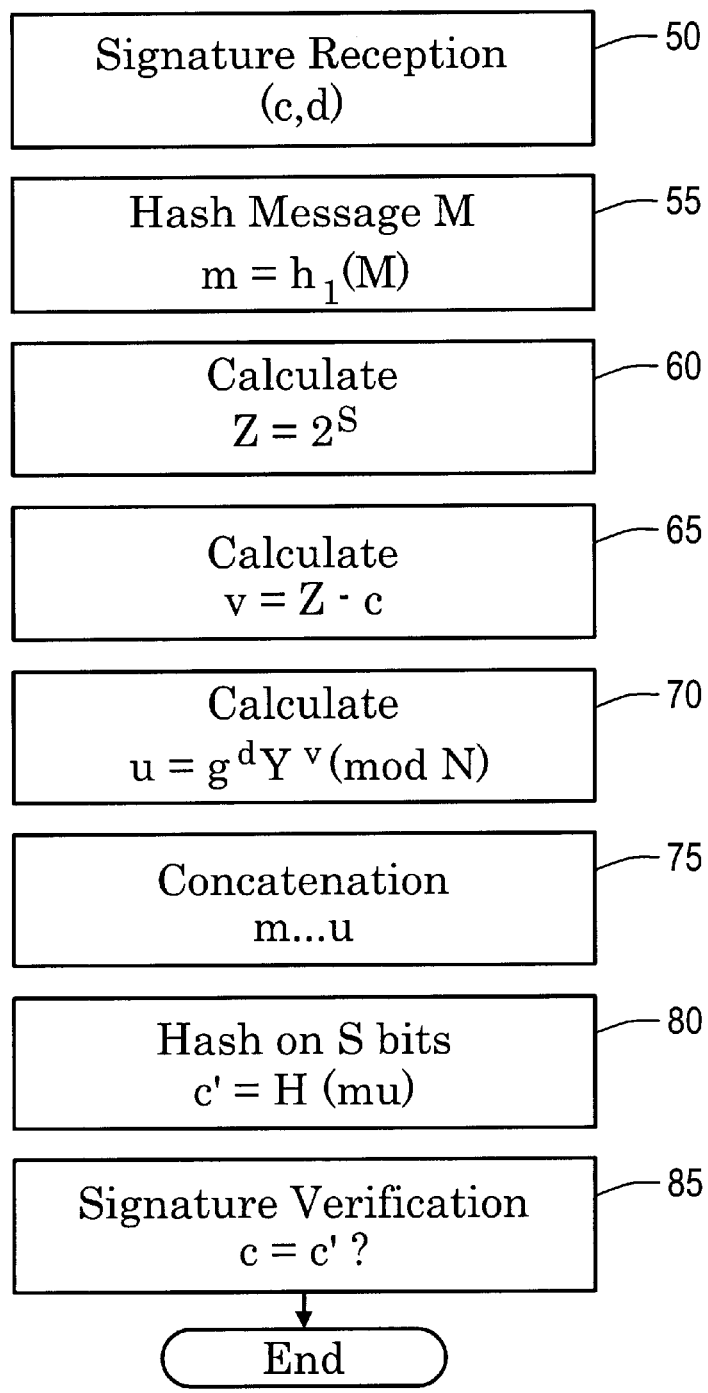
FIG. 2 is a diagram of a process for authenticating a digital signature generated by the method shown in FIG. 1.

The pair (c,d) represents the signature of the message. This signature is transmitted, in addition to message M, to entity B. Then begins the second step, the step in which the signature described in relation to FIG. 2 is authenticated. It is entirely accomplished by entity B.

After signature (c,d) and message M corresponding to it have been received, message M can be hashed by has function $h_1$.

We then write $Z=2^S$, S being fixed by the choice of the hash function.

We calculate the number v by the following formula:

$$v = Z - c$$

We calculate the number u by the following formula:

$$u = g^d Y^v \pmod{N}$$

We concatenate numbers m and u.

We hash the result of concatenation by hash function H, on S bits. The result obtained is noted c'.

We then verify the signature sent by entity A. If c=c", then the sender of message M can only be the entity A, provided the secret key x of entity A has not been revealed. If not, and c and c' are different, the message has been forged.

What is claimed is:

1. A method for generating a digital signature (c, d) of a message M, comprising:

defining a modulo N and a base g, a public key Y, and a private key x, the parameters N, g, Y, and x being linked by the relationship $y = g^x \pmod{N}$;

defining a hash function H the size of whose result having S bits;

choosing a number r of T bits where $T \geq 2S$;

calculating u from the following relationship $u = g^r * Y^z \pmod{N}$ where $Z = 2^S$;

hashing the concatenation of M and u, by function H, the number thus obtained being the value c of the signature; and calculating the value d of the signature by the relationship $d = r + c*x$.

2. The method according to claim 1, wherein the message M is hashed by a function $h_1$ before being hashed by the function H then concatenated with u.

3. The method according to claim 2, wherein the functions H and $h_1$ are identical.

4. The method according to claim 1, wherein the private key x is defined before public key Y, the public key Y being calculated by the relationship $Y = g^x \pmod{N}$.

5. The method according to claim 1, wherein the public key Y is defined before private key x, and wherein modulo N is not a prime.

6. The method according to claim 1, wherein the number r is a random number.

7. A method for authenticating the digital signature (c, d) of a message M generated by the method according to claim 1, wherein when public key Y, modulo N, and base g and hash function H, and the value of S are known, further comprising:

calculating u by the relationship $u = g^d * Y^{(z-c)} \pmod{N}$ where $Z = 2^S$;

hashing the concatenation of M and u by the function H; and checking that the value thus obtained is equal to c if the signature is authentic.

8. The method according to claim 7, wherein the message M is hashed by the function $h_1$ before being hashed by the function H and then concatenated with u.

9. The method according to claim 8, wherein the functions H and $h_1$ are identical.

* * * * *